Nov. 15, 1955   C. F. SCHWARTZ, SR   2,723,481
FISHERMEN'S CASTING NET
Filed March 16, 1954
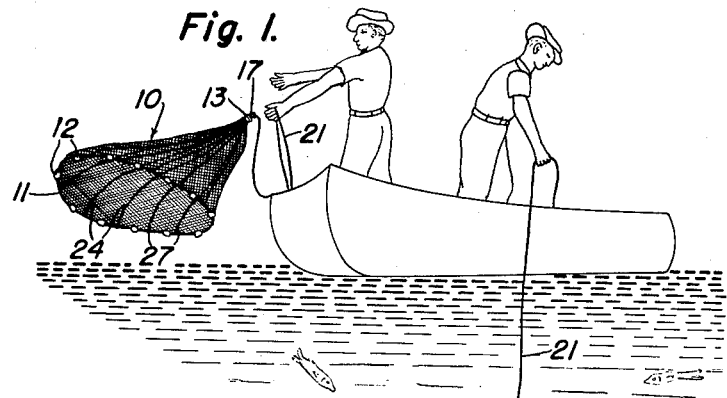
Fig. 1.
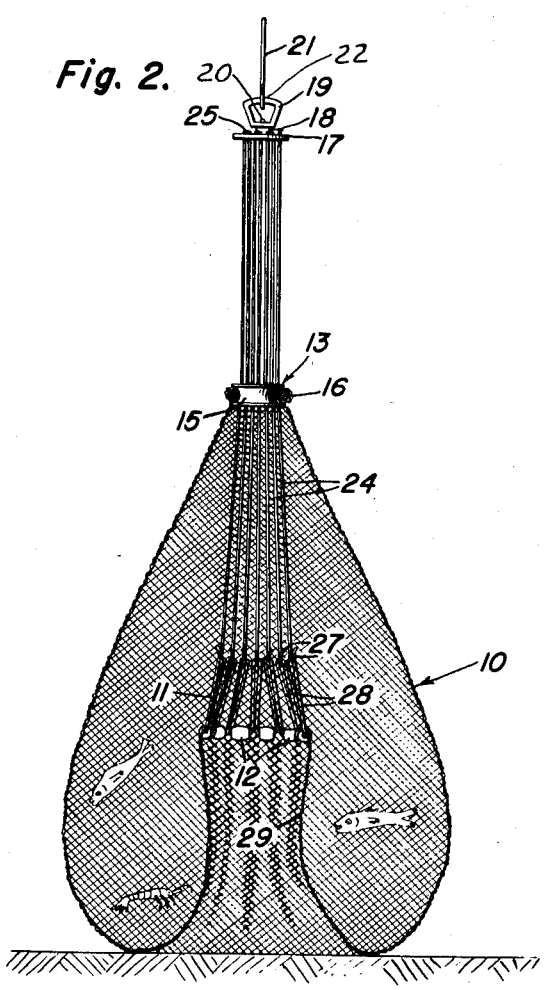
Fig. 2.
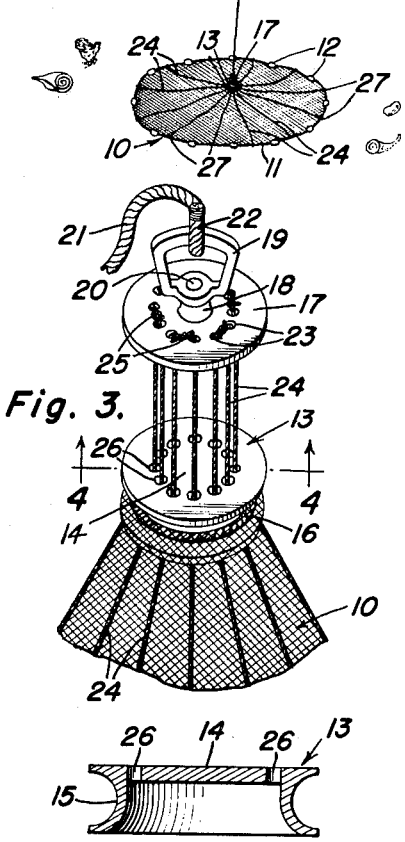
Fig. 3.
Fig. 4.
INVENTOR.
Charles F. Schwartz, Sr.
BY
ATTORNEY

United States Patent Office 2,723,481
Patented Nov. 15, 1955

2,723,481

FISHERMEN'S CASTING NET

Charles F. Schwartz, Sr., Clermont Harbor, Miss.

Application March 16, 1954, Serial No. 416,504

3 Claims. (Cl. 43—7)

The present invention relates to improvements in fishermen's casting nets.

A primary object of the invention is to provide an improved casting net of the general type used by fishermen for harvesting shrimp and other bait, the net being so constructed that it may be used much more rapidly and efficiently than conventional casting nets presently in use for the same purpose.

A further object is to provide a casting net of the above-mentioned character having novel means to prevent tangling of the brail lines used to pull up the net into a bag-like configuration, when the same is drawn from the water.

Another object is to provide means for assuring that all of the brail lines will remain of the same length, thus assuring that the net will be spread evenly on the bottom and pulled up evenly in the middle during hauling in of the net.

Still another object is to provide a casting net which is simplified in construction, economical to manufacture, sturdy and durable and easy to use by those skilled in the art.

Other objects and advantages of the invention will be apparent during the course of the following description.

In the accompanying drawings, forming a part of this application, and in which like numerals are employed to designate like parts throughout the same, Figure 1 is a perspective view illustrating the use or operation of a casting net made in accordance with the invention, Figure 2 is a central vertical longitudinal section through the net in use, Figure 3 is an enlarged fragmentary perspective view showing my improved operating means for the net, and, Figure 4 is an enlarged vertical section through the ring or furl, to which the center of the net is attached.

In the drawings, where for the purpose of illustration is shown a preferred embodiment of the invention, the numeral 10 designates the net proper, which may be of the conventional mesh type commonly used for bait casting and the like. When the net 10 is spread out on the river bottom, or the like, it is circular in configuration, as shown in Figure 1. The center of the net, as well as its circumferential edge or margin is adapted to be drawn upwardly, in vertically spaced relation, as indicated in Figure 2, for forming an annular bag-like net structure or trap for the bait being harvested.

The margin or circumferential edge of the net 10 is provided with a cord or line 11, slidably received by the loops or mesh of the net 10 adjacent to its margin. The cord 11 extends continuously about the margin of the net 10, and is preferably freely adjustable circumferentially of the net, due to its loose connection with the mesh of the net. A number of tubular sinkers 12, formed of lead or the like are slidably mounted upon the marginal cord 11 and spaced equidistantly, circumferentially of the net, as shown.

The net 10 has a small opening formed centrally therein for receiving an attaching ring or furl 13. This furl 13 embodies a top flat wall or disc 14, and a depending marginal flange or skirt portion 15 which is preferably arcuate in cross section, as shown. The furl 13 is received by the central opening of the net 10 and secured therein tightly by a cord 16, which clamps the portion of the net surrounding the small central opening to the annular flange or skirt 15, as shown.

I provide a swivel unit including a flat circular disc 17, separate from the furl 13, and provided at its center with an upstanding projection or boss 18, preferably formed therewith. A loop or ring 19 is swiveled to the boss 18 and disc 17 by a rivet 20 or the like. A hand line 21 of the desired length is attached to the loop 19 at 22.

The disc 17 is provided outwardly of the boss 18 with a plurality of circumferentially equidistantly spaced pairs of spaced openings 23, such as six pairs of openings. The openings 23 extend through the disc 17, as shown. A number of brail lines 24, corresponding to the number of pairs of openings 23 are provided, and each brail line 24 has its ends inserted through a pair of the openings 23 and passed downwardly toward the furl 13. Each brail line 24 is provided exactly at its longitudinal center with a knot 25, large enough so that it will not pass through one of the openings 23, Figure 3. This assures that the two sections or strands of each brail line 24 will be of the same length, which is desirable.

The top wall 14 of the furl 13 is provided just inwardly of the skirt 15 with a plurality of circumferentially spaced guide openings 26, corresponding in spacing and number to the openings 23. The guide openings 26 slidably receive the brail lines 24, as shown, and the brail lines after passing through the furl 13 extend outwardly to the margin of the net 10 and are secured to the marginal cord 11 at a plurality of circumferentially equidistantly spaced points thereon, as best shown in Figure 1. The brail lines 24 are preferably attached at 27 to the marginal cord 11 midway between adjacent pairs of the sinkers or weights 12, and the ends of the brail lines 24 are fixedly secured to the cord 11, by tying or the like, and are not slidable with respect to the cord 11, as are the weights 12. With this arrangement, each weight 12 is constrained by the pair of brail lines 24 upon each side of it, and further, the weights 12 will tend to remain equidistantly spaced circumferentially of the cord 11, due to their disposition between the mesh or loops of the net 10, where the net receives the cord 11.

Although I have mentioned, merely as an example, six pairs of openings 23 in the disc 17 for accommodating a corresponding number of brail lines 24, it should be understood that I do not intend to limit the invention by any particular number of openings 23, brail lines 24 or weights 12, and the numbers of these elements in the device may be varied as desired.

In the use of the net for casting, the furl 13 is freely slidable longitudinally upon the several brail lines 24, toward and from the disc 17. When casting, the fisherman coils the hand line 21 in one hand, after having pulled up the center of the net so that the furl 13 engages the bottom of the disc 17. The hand line 21, furl 13 and swivel unit are now held in one hand. The fisherman holds one of the lead weights 12 in his mouth, and bundles or folds about two-thirds of the net 10 on his other arm. He now swings the net and throws it in such a manner that it spreads out upon the water in a flat circular form and sinks immediately to the bottom, as is well known to those skilled in the art. The cord 11 and weights 12 are now arranged in a circle defining the circumference of the flat net on the bottom.

For hauling in the catch, the hand line 21 is now pulled up, and the brail lines 24 which are radially disposed, like spokes, Figure 1, draw the margin of the net radially inwardly toward the center thereof, as shown in Figure 2. This operation develops slack loops 28 of equal lengths in the cord 11, which cord is slidable within the weights or sinkers 12, see Figure 2. The weights 12 are shifted inwardly in closely spaced relation at the center of the net, and as the hand line 21 is pulled upwardly, the brail lines 24 become straight or vertical, as shown in Figure 2. The net 10, by this operation, assumes an annular bag-like configuration, with the portion of the net which previously defined its margin now pulled upwardly at the center toward the furl 13 and forming a vertical sleeve or tube 29, as indicated in Figure 2, inwardly of the outer side wall of the net. This action entraps all of the bait covered by the net 10 when the same was resting upon the bottom in the flat condition shown in Figure 1.

The net is now hauled into the boat with the hand line 21, and the brail lines 24 may pull the slack loops 28 upwardly until they reach the furl 13 for completely closing the annular bag-like net. After the net is in the boat, the furl 13 is pulled upwardly until it contacts the disc 17, and this immediately turns the net inside out and dumps the catch in the bottom of the boat or the like. As soon as the net is empty, it is again ready for casting in the same manner.

A chief feature of the invention resides in the cooperation of the upper swivel unit and the apertured furl 13. The swivel unit prevents twisting and tangling of the hand line 21 and brail lines 24, and the guide openings 26 prevent tangling of the brail lines 24 with each other or with the side of the net, which difficulties are frequently encountered in casting nets of conventional design, not equipped with my swivel unit and apertured furl 13. Each time that the furl 13 is moved longitudinally of the brail lines 24, it immediately straightens and untangles the same from the net and from each other, if any tangling or tendency to tangle is present.

My construction provides a highly convenient and efficient casting net which may be operated much more rapidly than conventional nets, without the fear of the brail lines becoming entangled with each other or with the net proper. Casting of the net is rendered much more carefree and enjoyable, and since the net may be hauled in very rapidly, there is less chance of the catch escaping.

It is to be understood that the form of the invention, herewith shown and described is to be taken as a preferred example of the same, and that various changes in the shape, size and arrangement of parts may be resorted to, without departing from the spirit of the invention or scope of the subjoined claims.

Having thus described my invention, I claim:

1. A casting net for fishermen comprising a net body portion of substantially circular shape when flat, a cord secured to the net near its margin and extending circumferentially thereabout, a plurality of weights carried by the cord in circumferentially spaced relation, a furl secured to the net near its center and having a plurality of guide openings, a disc separate from the furl and provided with a plurality of openings corresponding in number to the openings of the furl, an element swieveled to said disc and adapted for attachment to a hand line, and a plurality of brail lines extending through the openings of the furl and movable through such openings and having corresponding ends secured to said cord in circumferentially spaced relation, the brail lines beeing looped through pairs of openings of said disc and knotted between each pair of openings of the disc so that the brail lines will have sections of substantially equal length running from the disc to said cord.

2. A casting net for fishermen comprising a generally circular net body portion, a furl secured to the net near its center and having a plurality of guide openings extending therethrough, a disc separate from the furl and provided with a plurality of openings corresponding in number to the openings of the furl, an element swivelled to said disc, a flexible hand line secured directly to said element, and a plurality of brail lines extending through the openings of the furl and movable therethrough and having corresponding ends secured to the net body portion adjacent the circumferential margin of the same in spaced relation, said brail lines being looped through pairs of openings of said disc and knotted between each pair of openings of the disc so that the brail lines will have sections of substantially equal length running from said disc to the circumferential margin of the net body portion.

3. A casting net for fishermen comprising a generally circular net body portion, a furl secured to the net body portion near its center and having a plurality of guide openings, a swivel unit having a plurality of openings corresponding in number to the openings of the furl, a flexible hand line secured directly to said swivel unit, and a plurality of brail lines extending slidably through the openings of the furl and having corresponding ends secured to the circumferential margin of the net body portion in substantially equidistantly spaced relation, said brail lines being looped through pairs of the openings in the swivel unit for connecting the brail lines thereto.

References Cited in the file of this patent

UNITED STATES PATENTS

| 796,709 | Cornet | Aug. 8, 1905 |
| 876,148 | Cloud | Jan. 7, 1908 |
| 1,154,563 | Dorsey | Sept. 21, 1915 |
| 1,762,881 | Nicolayson | June 10, 1930 |

FOREIGN PATENTS

| 24,348 | France | June 20, 1922 |